US010178559B2

(12) United States Patent
Ivanov et al.

(10) Patent No.: US 10,178,559 B2
(45) Date of Patent: Jan. 8, 2019

(54) INCOMPLETE NAVIGATION DATA OF INDOOR POSITIONING SYSTEMS (71) Applicant: HERE Global B.V., Eindhoven (NL)

(72) Inventors: Pavel Ivanov, Tampere (FI); Pasi Pentikainen, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/818,993

(22) Filed: Nov. 21, 2017

(65) Prior Publication Data
US 2018/0109961 A1 Apr. 19, 2018

Related U.S. Application Data (63) Continuation of application No. 15/295,253, filed on Oct. 17, 2016, now Pat. No. 9,860,759.

(51) Int. Cl.
H04W 16/20 (2009.01)
H04B 17/318 (2015.01)
(Continued)

(52) U.S. Cl.
CPC .......... H04W 16/20 (2013.01); G01C 21/206 (2013.01); G01S 5/0252 (2013.01); H04B 17/318 (2015.01); H04L 43/16 (2013.01)

(58) Field of Classification Search
CPC ... H04B 7/0417; H04B 7/0452; H04W 64/00; H04W 24/08; H04W 4/08; H04W 64/006;
(Continued)

(56) References Cited

U.S. PATENT DOCUMENTS 9,860,759 B1 * 1/2018 Ivanov .................. H04W 16/20
2011/0246148 A1 * 10/2011 Gupta .................. H04W 64/00
703/2

(Continued)

FOREIGN PATENT DOCUMENTS

CN 105338498 A 2/2016
WO WO2015197107 A1 12/2015
WO WO2016087008 A1 6/2016

OTHER PUBLICATIONS

Xiaoyong Chai; et al., Reducing the Calibration Effort for Probabilistic Indoor Location Estimation, < http://ftp.cse.ust.hk/~qyang/Docs/2007/XiaoYongChaiTCM07.pdf > Apr. 30, 2007.
(Continued)

Primary Examiner — Diane Mizrahi
(74) Attorney, Agent, or Firm — Lempia Summerfield Katz LLC (57) ABSTRACT A method is disclosed comprising: determining, using a processor, whether a radio model of at least one radio node associated with a data set is incomplete based on a comparison between the coverage area of the radio model of the at least one radio node and a cumulative coverage area generated out of radio models of the at least one radio node associated with a plurality of data sets, wherein a data collection comprises the plurality of data sets and the data collection is indicative to at least one indoor radio map. Further disclosed are a corresponding apparatus, a corresponding system and a corresponding software program.

20 Claims, 4 Drawing Sheets (51) Int. Cl.
H04L 12/26 (2006.01)
G01C 21/20 (2006.01)
G01S 5/02 (2010.01)

(58) Field of Classification Search
CPC ............. H04W 72/042; H04W 72/044; H04W 72/085
See application file for complete search history.

(56) References Cited

U.S. PATENT DOCUMENTS

| | | | |
|---|---|---|---|
| 2011/0304503 A1* | 12/2011 | Chintalapudi | G01S 5/0252 342/357.29 |
| 2013/0033999 A1* | 2/2013 | Siomina | G01S 5/0236 370/252 |
| 2013/0162481 A1* | 6/2013 | Parvizi | G01S 3/023 342/452 |
| 2013/0172020 A1* | 7/2013 | Aweya | G01S 5/0252 455/457 |
| 2014/0243017 A1 | 8/2014 | Das et al. | |
| 2015/0223027 A1 | 8/2015 | Ahn et al. | |
| 2015/0350844 A1 | 12/2015 | Agarwal et al. | |

OTHER PUBLICATIONS

Kushki A et al: "Intelligent Dynamic Radio Tracking in Indoor Wireless Local Area Networks", IEEE Transactions on Mobile Computing, IEEE Service Center Los Alamitos, CA, US, vol. 9, No. 3, Mar. 1, 2010, pp. 405-419, ISSN: 1536-1233.

Mohamed M Atia et al: "Dynamic Online-Calibrated Radio Maps for Indoor Positioning in Wireless Local Area Networks", IEEE Transactions on Mobile Computing, IEEE Service Center Los Alamitos, CA, US, vol. 12, No. 9, Sep. 1, 2013, pp. 1774-1787, ISSN:1536-1233.

PCT International Search Report and Written Opinion of the International Searching Authority dated Jan. 17, 2018 for corresponding PCT/EP2017/076421.

* cited by examiner

Fig.5

INCOMPLETE NAVIGATION DATA OF INDOOR POSITIONING SYSTEMS

This application is a continuation under 37 C.F.R. § 1.53(b) and 35 U.S.C. § 120 of U.S. patent application Ser. No. 15/295,253 filed Oct. 17, 2016 which is incorporated by reference in its entirety.

FIELD

The following disclosure relates to the field of navigation, or more particularly relates to systems, apparatuses, and methods for indoor positioning systems.

BACKGROUND

For scalable indoor positioning systems, they are required to be based on an existing infrastructure in the buildings and on existing capabilities in the consumer devices. Therefore, indoor positioning systems should be based on radio-based technologies, e.g. WiFi- and/or Bluetooth technologies.

One approach for such radio-based indoor positioning is to model the radio environment (e.g. WiFi- and/or Bluetooth environment) from observed Received Signal Strength (RSS) measurements, which are generated into a 2-dimensional radio map. The radio map is used as navigation data and represents for instance the dynamics of the indoor radio propagation environment, e.g. represented by radio models of radio nodes in the building. Based on this information, determining of an indoor position can be achieved in a highly accurate way within the coverage of the generated radio map.

For acquiring data necessary for generating the radio map, huge volumes of indoor radio data by measurements could be harvested e.g. via crowd-sourcing by electronic devices of consumers, which are equipped with the necessary functionality to enable for instance the data collection as a background process, naturally with the end-user consent.

The radio map is generated from harvested data, which is collected from all areas within a building, where localization functionality is needed, during sufficiently short period of time. If data is harvested from all areas within the building, which is collected during different times, or if data is harvested from partial areas within the building, e.g. only of a specific floor, incomplete radio models may occur in the generated radio map. This may have badly impact on localization performance of such indoor positioning systems.

It is an object of the disclosure to detect incomplete radio models and process data associated with incomplete radio models of a generated radio map properly.

SUMMARY

According to a first exemplary embodiment, a method performed and/or controlled by at least one apparatus is disclosed, the method comprising:
  determining, using a processor, whether a radio model of at least one radio node associated with a data set is incomplete based on a comparison between the coverage area of the radio model of the at least one radio node and a cumulative coverage area generated out of radio models of the at least one radio node associated with a plurality of data,
  wherein a data collection comprises the plurality of data sets and the data collection is indicative to at least one indoor radio map.

This method may for instance be performed and/or controlled by an apparatus, for instance a server. Alternatively, this method may be performed and/or controlled by more than one apparatus, for instance a server cloud comprising at least two servers.

According to a further exemplary aspect of the disclosure, a computer program is disclosed, the computer program when executed by a processor causing an apparatus, for instance a server, to perform and/or control the actions of the method according to the first exemplary embodiment.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the disclosure, an apparatus is disclosed, configured to perform and/or control or comprising respective means for performing and/or controlling the method according to the first exemplary embodiment.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the disclosure, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary embodiment.

The above-disclosed apparatus according to any aspect of the disclosure may be a module or a component for a device, for example a chip. Alternatively, the disclosed apparatus according to any aspect of the disclosure may be a device, for instance a server or server cloud. The disclosed apparatus according to any aspect of the disclosure may comprise only the disclosed components, for instance means, processor, memory, or may further comprise one or more additional components.

According to a further exemplary aspect of the disclosure, a system is disclosed, comprising: an apparatus according to any aspect of the disclosure as disclosed above, and a terminal, wherein the terminal is configured to perform and/or control the method according to exemplary aspects of the disclosure.

In the following, exemplary features and exemplary embodiments of all aspects of the present disclosure will be described in further detail.

Embodiments of the disclosure may involve indoor radio maps. As used herein, the term "radio map" may for instance include a data collection of data sets (typically stored as a computer-readable medium) comprising mathematical representation of wireless signal propagation characteristics and/or propagation channel parameters related to a certain area within a building. A building may be divided into a plurality of areas, and consequently an indoor radio map may for instance comprise wireless signal propagation characteristics and/or propagation channel parameters related to at least one area of said plurality of areas.

The data collection of data sets may for instance be organized in any format and may include one or more tables, a database, one or more lists, strings of parameters or numerical values, XML, or any combination between them to name but a few examples. The data set may for instance comprise numbers, mathematical formulae, text (e.g. text describing the area, indoor radio map characteristics, indoor radio map generation related data, threshold values, date and time, keys, indoor radio map data structure, search methods, quality factors, or the like), geographical information (e.g. coordinates, offsets, etc.), pointers, indexes, mathematical representation of geometric shapes, ID's (identification code), statistical data, addresses, or any combination between them to name but a few examples.

The indoor radio map may for instance comprise compressed and/or uncompressed data, binary strings or numbers, ASCII characters, ISO codes, or any other type of data encoding.

An indoor radio map for an area may for instance be generated only once or several times over a period of time. An indoor radio map may for instance be modified in part, e.g. by incremental updates and/or patches, or in its entirety.

The term "area" refers to any space, bounded or unbounded, in which electronic devices, e.g. terminals, mobile wireless devices like tablets, smartphones or the like can operate. This space can be indoors or outdoors associated to a building, on the ground, underground, or above ground, or any combination thereof. The term "area" may for instance include for example a room, a group of rooms, a portion of a building (e.g. a floor, a portion of a floor, or group of floors or portions of floors), elevated spaces, a yard, parking lot or garage, warehouse, business, residence, office, mall, plaza, casino, sports facility, food service facility, depot, hospital or other medical facility, storage facility, repair facility, manufacturing facility, transportation hub, distribution hub, campus, living facility, city, town, village or neighbourhood or any portion thereof; public or private space, tunnels, any space on any suitable vehicle, including ships or other watercraft, aircraft or any other vessels; and any and all combinations of the above, portions of the above, or combinations of portions of the above.

Moreover, as used herein, the term "area" is not limited to a space of any particular size or shape. An "area" can be fixed in size and/or shape, or can have a size and/or shape that dynamically changes over time.

The data collection comprises the plurality of data sets. Each of the plurality of data sets may for instance be radio data measured for instance by an electronic device. In particular, the radio data may for instance be observed received signal strength (RSS)-measurements. Observed RSS may for instance be based on signals received by an electronic device from one or more access points/radio nodes. One or more access points/radio nodes may for instance be in a building, or be a part of the infrastructure of the building. Each data set may for instance comprise radio data, which was observed RSS by one or more electronic devices. At least one of such a data set may for instance be generated/mapped into a radio map, e.g. a 2-dimensional radio map. The radio map may for instance represent the dynamics of the indoor radio propagation environment within the building, e.g. represented by radio models of radio nodes in the building.

Such radio models can be coverage area estimates of radio nodes, radio node positions and/or radio channel models, with radio nodes of WiFi- and/or Bluetooth networks being exemplary radio nodes. One or more of the aforementioned radio models may for instance be part of a radio map, which may be used for indoor positioning purposes, e.g. for the localization of the position of electronic devices, e.g. mobile terminals, smartphones, tablets to name but a few typical examples.

Radio data of signals of some of the radio nodes in a building may for instance be not collected at all, for instance resulting in an incomplete radio model of at least one radio node associated with one or more data sets of the plurality of data sets. Radio data of signals of some of the radio nodes in a building may for instance result in measurements of partial radio data for such radio nodes. For instance, radio data of signals of one specific radio node in a may for instance be collected on a floor of a building. Further, radio data of signals of the same specific radio node in a building may for instance be collected on another floor of a building, but the radio data may comprise only a small amount of radio data, e.g. data samples collected from the specific radio node. Corresponding radio models may for instance be incomplete resulting in having a bad impact on indoor positioning performance, which is based on a radio map comprising for instance incomplete radio models.

For determining whether a radio model of at least one radio node associated with a data set is incomplete, a comparison between the coverage area of the radio model of the at least one radio node associated with the data set and a cumulative coverage area generated out of radio models of the at least one radio node associated with the plurality of data sets of the data collection is performed and/or controlled. In this way, a comparison between the coverage area of one radio node, which may for instance be obtained from the radio data comprised in the data set, and a cumulative coverage area of the same radio node is performed and/or controlled. The cumulative coverage area may for instance be generated by combining one or more coverage areas of radio models of the same radio node, which may be associated with one or more of the plurality of data sets of the data collection. The cumulative coverage area may for instance comprise with a very high likelihood the complete/full coverage area of the radio model of the at least one radio node. In case the comparison leads to the result that the coverage area of the radio model of the at least one radio node is mostly covered by the cumulative coverage area generated out of radio models of the at least one radio node associated with a plurality of data sets, the radio model of the at least one radio node is considered to be complete. Otherwise, it is considered to be incomplete. The cumulative coverage area generated out of radio models of the at least one radio node associated with a plurality of data sets may for instance comprise the coverage area of the radio model of the at least one radio node associated with the data set as well. It is to be understood that only those data sets of the plurality of data sets may for instance be included when the cumulative coverage area is generated, if these data sets of the plurality of data sets are associated with the at least one radio node as well.

According to an exemplary embodiment of all aspects of the disclosure, each of the plurality of data sets of the data collection is associated with a certain capture time.

The certain capture time may for instance be a specific time at which radio data for the data set of the plurality of data sets was captured, e.g. by an electronic device. It may for instance be a time frame, e.g. a couple of hours, or a couple of days to name but a few examples. The certain capture time may for instance be indicative to incomplete radio models of at least one radio node. If data sets are collected from all areas of a building during different certain capture times, incomplete radio models of radio nodes within the building may for instance occur.

According to an exemplary embodiment of all aspects of the disclosure, each of the plurality of data sets of the data collection is associated with a certain capture area, wherein the area is representative to an area of the at least one indoor radio map.

The certain capture area may for instance be representative to at least a part of an area of a building, at least a part of a floor of a building, at least a space of a building, at least a part of a room of a building and/or at least a part of a place of a building to name but a few examples.

Each data set of the plurality of data sets comprised by the data collection may for instance be associated with a certain capture time and/or certain capture area.

In an exemplary embodiment of all aspects of the aforementioned embodiments, the method further comprising:
  generating at least one area indication, wherein the area indication is indicative to the area associated with the data set being associated with the determined incomplete radio model of the at least one radio node.

The at least one area indication may for instance be indicative to an area of a building, where additional radio data may be needed to be collected. The additional collected radio data may for instance be added to the data set being associated with the determined incomplete radio model of the at least one radio node. In this way, an incomplete radio model of a radio node associated with the data set may for instance be complemented.

A plurality of area indications may for instance be generated in case a plurality of incomplete radio models of radio nodes associated with the plurality of data sets are determined. Each incomplete radio model associated with or comprised by the at least one indoor radio map may for instance be complemented. Additional radio data may for instance be added to each of the plurality of data sets of the data collection. In this way, the data collection may for instance be indicative to at least one complete indoor radio map.

According to an exemplary embodiment of all aspects of the disclosure, the method, prior to determining, further comprising:
  selecting one or more data sets of the plurality of data sets of the data collection, which are associated with the same certain capture time.

By selecting one or more data sets of the plurality of data sets of the data collection associated with the same certain capture time, the data collection may for instance be separated into one or more data sets that were captured at different certain capture times.

It may then for instance be determined, whether a radio model of at least one radio node associated with a data set that is associated with a certain capture time is incomplete.

In an exemplary embodiment of aspects of the aforementioned embodiment, the method further comprising:
  checking or causing checking whether the coverage area of the selected one or more data sets intersects the coverage area of the plurality of data sets of the data collection; and
  determining a suspect information based on the checking, wherein the suspect information is indicative to a data set of the selected one or more data sets associated with at least one incomplete radio model.

The checking or causing checking may for instance perform and/or control a comparison between the coverage area of the selected one or more data sets and the coverage area of the plurality of data sets of the data collection. The coverage area of the selected one or more data sets may for instance be a coverage area generated out of each coverage area of the selected one or more data sets, e.g. by cumulating each coverage area of the selected one or more data sets together. The coverage area of the plurality of data sets of the data collection may for instance be a coverage area generated out of each coverage area of the plurality of data sets of the data collection, e.g. by cumulating each coverage area of the plurality of data sets of the data collection together. The coverage area of the plurality of data sets of the data collection may for instance be indicative to the complete/full coverage area of the at least one radio map.

The suspect information may for instance be determined with respect to the amount of intersecting parts and/or intersecting percentage between the coverage area of the selected one or more data sets and the coverage area of the plurality of data sets of the data collection. In case the coverage area of the selected one or more data sets does not intersect the coverage area of the plurality of data sets of the data collection, a suspect information is determined. In case the coverage area of the selected one or more data sets does not intersect at least most of the coverage area of the plurality of data sets of the data collection, a suspect information is determined. If the coverage area of the selected one or more data sets intersects at least most of the coverage area of the plurality of data sets of the data collection may for instance be determined based on a threshold value. The threshold value may for instance be a percentage value. In case the amount of intersecting parts and/or intersecting percentage between the coverage area of the selected one or more data sets and the coverage area of the plurality of data sets of the data collection may for instance exceed the threshold value, e.g. going below the threshold value, the suspect information may for instance be determined.

In an exemplary embodiment of aspects of the aforementioned embodiment, the method further comprising:
  selecting at least one radio node of the data set of the selected one or more data sets associated with at least one incomplete radio model based on the suspect information;
  estimating a theoretical radio model coverage area of the selected radio node; and
  using the estimated theoretical radio model coverage area as the coverage area of the radio model of the at least one radio node when determining whether a radio model of at least one radio node associated with a data set is incomplete.

The suspect information may for instance be used for selecting the data set, which may comprises a radio model of at least one radio node, wherein radio model may be incomplete.

For determining whether the radio model is incomplete, a theoretical radio model coverage area is estimated. The estimating of the theoretical radio model coverage may for instance be performed and/or controlled based on the radio model of the at least one radio node associated with the data set. As an example, a way to define theoretical coverage of the model is by defining area within certain range (e.g. 50 meters) from the location of maximum RSS measurement corresponding to given radio node, and within cumulative coverage area of data collection. Default floor height of 3 meters may be used to determine theoretical coverage at the floors other than that of location of maximum RSS.

The estimated theoretical radio model coverage area may for instance be used as the coverage area of the radio model of the at least one radio node, e.g. when determining whether a radio model of at least one radio node associated with a data set is incomplete. The estimated theoretical radio model coverage area may for instance be determined based on the radio data of the data set, which was suspected by the determined suspect information. The estimated theoretical radio model coverage may for instance intersect at least most of the cumulative coverage area generated out of radio models of the at least one radio node associated with a plurality of data sets. In this case, the radio model of the at least one radio node is considered to be complete. Otherwise, it is considered to be incomplete.

In this way, it may be ensured with a very high likelihood whether the radio model of the at least one radio node, which is associated with the data set, is incomplete. As a result, it is known which radio model of at least one radio node is with a very high likelihood incomplete and it is known which data set or data sets of the plurality of data sets of the data collection is associated with the radio model with a very high likelihood to be incomplete.

According to an exemplary embodiment of all aspects of the disclosure, a pre-determined threshold value is considered when determining whether a radio model of at least one radio node associated with a data set is incomplete.

For instance, a matching percentage according to a threshold value of the coverage area may for instance be a value of at least 90%, 95%, 96%, 97%, 98%, 99%, or 100% must match.

According to an exemplary embodiment of all aspects of the disclosure, each of the plurality of data sets of the data collection is indicative to radio data collected by at least one electronic device.

According to an exemplary embodiment of all aspects of the disclosure, the method further comprising:
discarding at least temporarily a radio model of at least one radio node associated with a data set of the data collection, if the radio model was determined to be incomplete.

Discarding at least temporarily a radio model, which radio model was determined to be incomplete may for instance have an impact on indoor position performance when used for determining an indoor position of an electronic device. Incomplete radio models may for instance be excluded or not be associated with the at least one indoor radio map. Including or associating incomplete radio models with the at least one indoor radio map may result in bad performance of an indoor positioning system. By discarding such data sets of the plurality of data sets associated with incomplete radio models of the at least one radio node, performance of an indoor positioning system may be enhanced. Data to be processed, e.g. when using an indoor positioning, for instance a plurality of data sets of a data collection, wherein the data collection is indicative to at least one indoor radio, may be processed properly.

In an exemplary embodiment of aspects of some of the embodiments, the method further comprising:
using the area indication in a collecting process of radio data to collect a data of the area of the at least one indoor radio map having incomplete radio data or providing the area indication for use in such a collecting process.

Based on the area indication, an area of the at least one indoor radio map may for instance be identified, where additional radio data may be needed to be collected in order for preventing that data sets being indicative to the area of the at least one indoor radio map may be associated with an incomplete radio model of at least one radio node.

The collecting process may for instance comprise collecting additional radio data. Collected additional radio data may for instance be added to the data set being associated with the area of the at least one indoor radio map, which may be identified based on the area indication. In this way, the collecting process may for instance be used to collect radio data, e.g. by aforementioned measurements of radio data by an electronic device, to gather a data set of the area of the at least one indoor radio map having incomplete radio data.

It is to be understood that the collecting process may for instance be performed and/or controlled by a further at least one apparatus. In this case, the area indication may for instance be provided to the further at least one apparatus for use in such a collecting process.

In an exemplary embodiment of aspects of the aforementioned embodiment, the method further comprising:
generating at least one radio map based on the data collection and data set collected by the collecting process.

It is to be understood that the presentation of the disclosure in this section is merely by way of examples and non-limiting.

Other features of the disclosure will become apparent from the following detailed description considered in conjunction with the accompanying drawings. It is to be understood, however, that the drawings are designed solely for purposes of illustration and not as a definition of the limits of the disclosure, for which reference should be made to the appended claims. It should be further understood that the drawings are not drawn to scale and that they are merely intended to conceptually illustrate the structures and procedures described herein.

BRIEF DESCRIPTION OF THE DRAWINGS

In the figures show.

DETAILED DESCRIPTION

The following description serves to deepen the understanding of the present disclosure and shall be understood to complement and be read together with the description of the disclosure as provided in the above summary section of this specification.

Figure 1:
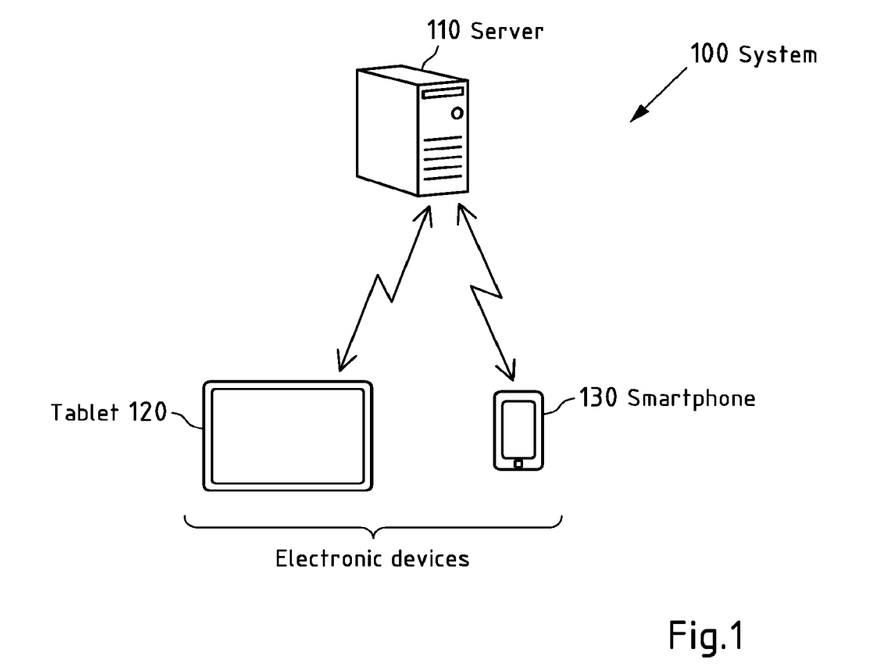
FIG. 1 a schematic block diagram of a system according to an exemplary embodiment of the present disclosure.

FIG. 1 is a schematic block diagram of a system according to an exemplary embodiment of the present disclosure. System 100 comprises a server 110, which may alternatively be embodied as a server cloud (e.g. a plurality of servers connected e.g. via the internet and providing serves at least partially jointly), an optional database (not shown in FIG. 1), which may be connected to the server e.g. via the internet and allowing access from the server 110 to data of the database, alternatively the database may be embodied e.g. in the server 110, and electronic devices, of which two different realizations are shown as an example: a tablet 120, and a mobile device 130, e.g. a smartphone.

Figure 4:
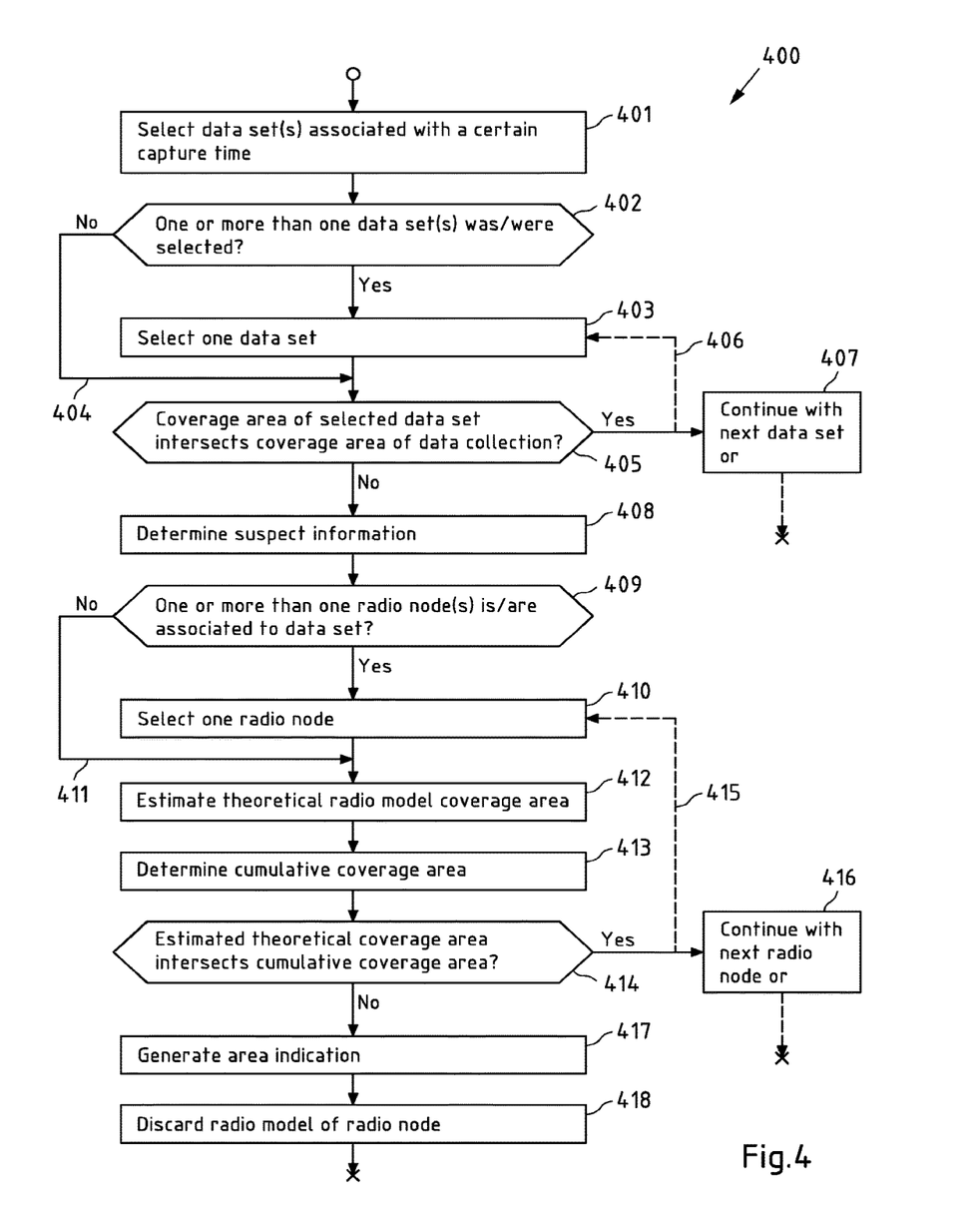
FIG. 4 a flowchart showing an example embodiment of a method according to an exemplary aspect of the present disclosure.

According to an example embodiment of the present disclosure, terminal 120, 130 may store a data collection comprising a plurality of data sets, e.g. data sets 441, 442 of FIG. 4, provided by server 110. Communication, e.g. for the transmission of the data collection stored locally at terminal 120, 130 between server 110 and terminal 120, 130 may for instance take place at least partially in a wireless function, e.g. based on cellular radio communication or on Wireless Local Area Network (WLAN) bases communication, to name but a few examples. A data collection may be indicative to at least one radio map. The terminal may be configured to receive at least one data set. At least one data set may be stored in a database accessible by server 110, and may be provided to terminal 120, 130 via server 110.

Figure 2:
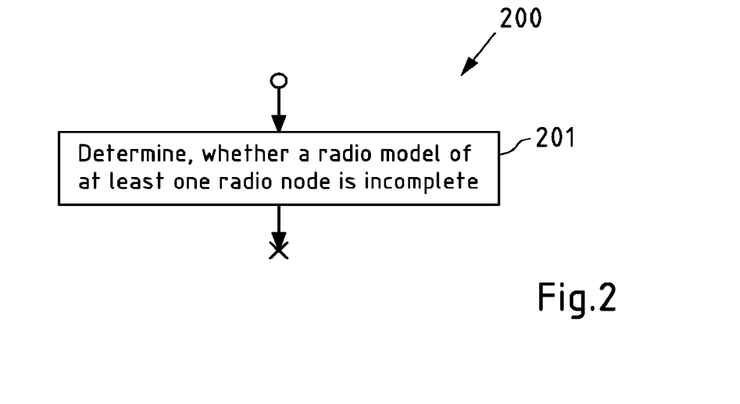
FIG. 2 a flowchart showing an example embodiment of a method according to an exemplary aspect of the present disclosure.

FIG. 2 is a flowchart 200 showing an example embodiment of a method according to an exemplary aspect of the present disclosure. This flowchart 200 may for instance be performed by server 110 of FIG. 1.

In the step 201, it is determined, e.g. by server 110 or by another apparatus, e.g. using a processor or a processor and a memory, configured to perform and/or control step 201, whether a radio model of at least one radio node associated with a data set is incomplete based on a comparison between the coverage area of the radio model of the at least one radio node and a cumulative coverage area generated out of radio models of the at least one radio node associated with a plurality of data sets, wherein a data collection comprises the plurality of data sets and the data collection is indicative to at least one indoor radio map.

Figure 3:
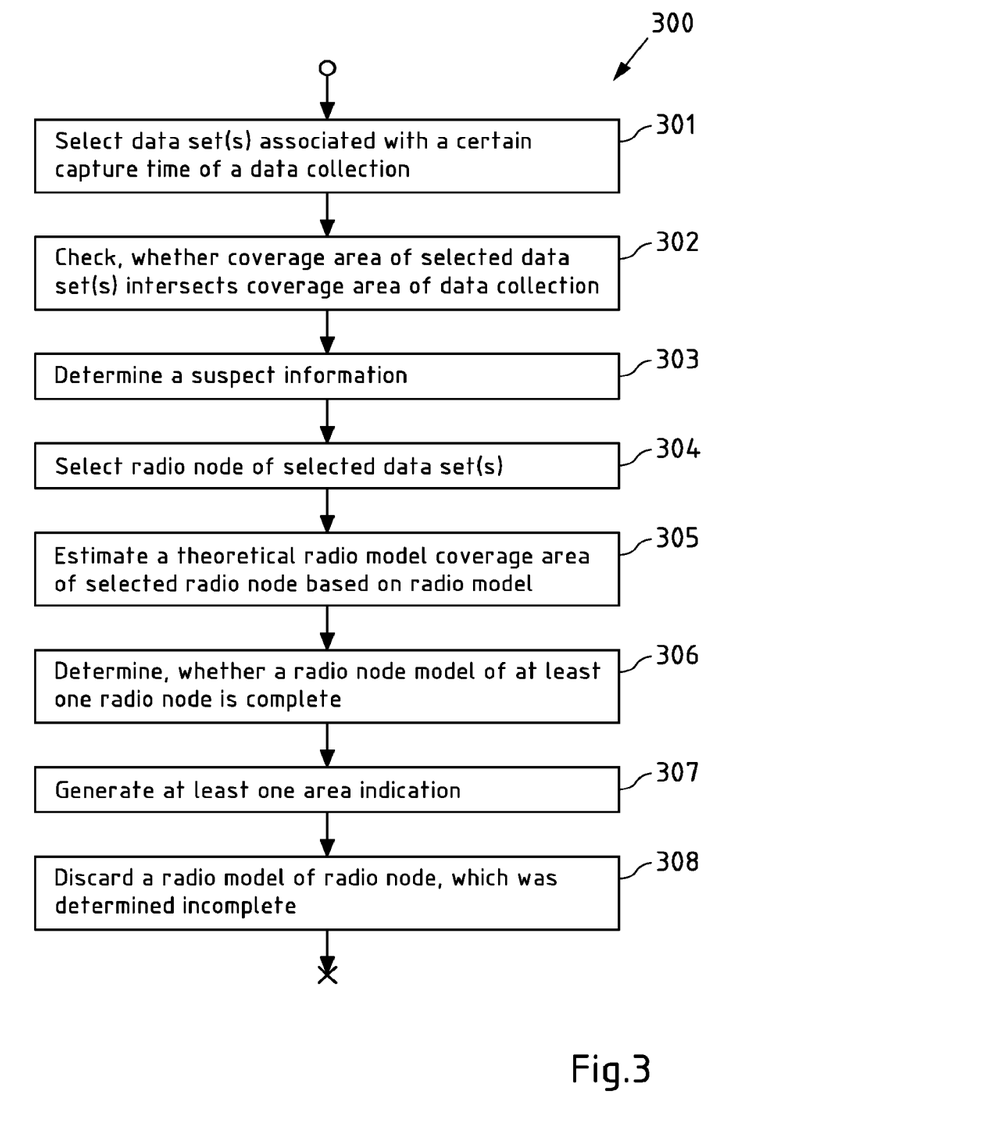
FIG. 3 a flowchart showing an example embodiment of a method according to an exemplary aspect of the present disclosure.

FIG. 3 is a flowchart 300 showing an example embodiment of a method according to an exemplary aspect of the present disclosure. This flowchart 300 may for instance be performed by server 110 of FIG. 1.

In step 301, one or more data set(s) associated with a certain capture time is selected out of a data collection. The data collection comprises a plurality of data sets, each of which is associated with a certain capture time. The data collection may for instance be indicative to at least one indoor radio map.

In this way, the plurality of data sets of the data collection, e.g. for a given building, is separated into data sets that were collected at different times. If data sets for the given building were collected at different times, there may be incomplete radio models of radio nodes associated with one or more of the data sets of the data collection.

For determining an incomplete radio model of at least one radio node, in step 302 it is checked or caused checking whether the coverage area of all radio models of radio nodes associated with that data set intersects the coverage area of the radio models of radio nodes associated with the plurality of data sets of the data collection.

In particular, a data set may be considered to comprise complete radio models, in case the coverage area of all radio models of radio nodes associated with the selected data set is at least almost identical or equal to—intersects—the coverage area of the radio models of radio nodes associated with the plurality of data sets of the data collection. In this case, the coverage area of all radio models of radio nodes associated with the selected data set represents the whole/full indoor radio map.

If the checking or causing checking of step 302 leads to the result, that the coverage area of all radio models of radio nodes associated with the selected data set is not almost identical or not equal to—does not intersect—the coverage area of the radio models of radio nodes associated with the plurality of data sets of the data collection, in step 303 a suspect information is determined. The suspect information may be indicative to the selected data set, which may be associated with at least one incomplete radio model.

Based on the suspect information, checking or causing checking of the data set may for instance be performed and/or controlled. In step 304, at least one radio node of the data set of the selected one or more data set(s) associated with at least one incomplete radio model is selected based on the suspect information.

The radio model of the selected at least one radio node associated with the one or more data set(s), which is selected in step 301, is suspected to be considered of having an incomplete radio model.

In step 305, a theoretical radio model coverage area of the selected radio node is estimated. The estimation may for instance be performed and/or controlled based on the radio model of the selected radio node.

In step 306, it is determined whether the radio model of the selected radio node associated with the selected data set is incomplete based on a comparison between the coverage area of the radio model of the selected radio node, e.g. the estimated theoretical radio model coverage of step 305 may be used for the comparison, and a cumulative coverage area of the radio model of the selected radio node, but which is generated out of the radio models of the same radio node as the selected radio node, but which are associated with the plurality of data sets of the data collection. The data set selected in step 301 may for instance be considered when generating the cumulative coverage area. In the alternative, all data sets of the plurality of data sets are considered but the selected data set of step 301. Further, the cumulative coverage area may for instance be generated out of the radio models of the same radio node as the selected radio node, which are associated with the plurality of data sets of the data collection associated with the same capture time as the selected data set.

In case the coverage area of the radio model of the selected radio node intersects at least most of the cumulative coverage area of the radio models of the selected radio node, the radio model of the selected radio node is considered to be complete. Otherwise, it is considered to be incomplete.

If the radio model of the selected radio node is considered to be incomplete, in step 307 an area indication is generated, wherein the area indication is indicative to the area associated with the selected data set of step 301. The selected data set of step 301 is associated with the incomplete radio model of the selected radio node of step 304.

Based on the generated area indication, additional radio data may for instance be collected, e.g. by radio data measurements of electronic devices, in order to complement the radio model, which is determined to be incomplete in step 306.

In case more than one radio node is associated with the selected data set of step 301, steps 304 to 307 may for instance be repeated in order to process each of the radio nodes associated with the selected data set of step 301.

In step 308, the radio model of the radio node, which is determined to be incomplete in step 306, is discarded at least temporarily. In this way, the radio model of the radio node is not used when performing and/or controlling indoor localization by an indoor positioning system, which used the data collection being indicative to the at least one indoor radio map.

In case more than one data sets are selected in step 301, steps 302 to 308 may for instance be repeated in order to process each of the selected data sets associated with the same certain capture time.

FIG. 4 is a flowchart 400 showing an example embodiment of a method according to an exemplary aspect of the present disclosure. This flowchart 300 may for instance be performed by server 110 of FIG. 1.

In step 401, one or more data set(s) associated with a certain capture time is selected out of a plurality of data sets of a data collection. The data collected is separated into one or more data set(s) associated with different certain capture times.

In step 402, it is checked or caused checking whether one or more than one data set(s) of the plurality of data set(s) is selected based on the associated certain capture time. In case only one data set is associated to the certain capture time of step 401, it may be proceeded with step 405, as shown by arrow 404. In case more than one data sets of the plurality of data sets are associated with the same certain capture time, it is proceeded with step 403.

In step 403, out of a plurality of selected data sets, one data set is selected. The selected data set is used in the following for determining whether it is associated with a radio model of at least one radio node considered to be incomplete.

In step 405, the coverage area of the selected data set is compared to the coverage area, which is generated out of the plurality of data sets associated with the certain capture time. In case at least most of these coverage areas intersect each other, it is considered that a radio model of the at least one radio node associated with the data set is complete.

In case in step 402 it is determined that more than one data set of the plurality of data sets is associated with the same certain capture time, it is proceeded with the next data set associated with the same certain capture time, indicated by arrow 406. Otherwise, the method may for instance be repeated/continued with one or more data set(s) associated with a different certain capture time, indicated by step 407.

In case it is considered in step 405 that not at least most of the compared coverage areas intersect each other, a suspect information being indicative to the selected data, which is associated with at least one incomplete radio model, is determined in step 408.

In step 409, it is checked or caused checking whether a radio model of one or more than one radio node(s) is associated with the selected data set. In case only one radio node is associated with the selected data set, step 410 is skipped and it is proceeded with step 412, as indicated by arrow 411. Otherwise, it is proceeded with step 410.

In step 410, one radio node is selected out of the plurality of radio nodes associated with the selected data set.

In step 412, a theoretical radio model coverage area of the radio node is estimated, e.g. based on radio model of the radio node.

In step 413, a cumulative coverage area generated out of radio models of the radio node associated with a plurality of data sets associated with the same certain capture time like the selected data set of step 401 is determined. The radio model of the radio node associated with the selected data set (step 401 or step 403) may for instance be included when generating the cumulative coverage area. In the alternative, this radio model of the radio node may for instance be excluded when generating the cumulative coverage area.

In step 414, the estimated theoretical radio model coverage area is compared to the cumulative coverage area. In case at least most of these coverage areas intersect each other, it is considered that the radio model of the radio node associated with the selected data set is complete. In this case, is it proceeded with the next radio node of the selected data set in case in step 409 it is determined that the data set is associated with more than one radio node, as shown by arrow 415. Otherwise, it is considered that no further radio nodes are associated with the selected data set of step 409, the method may for instance be repeated/continued with one or more data set(s) associated with a different certain capture time, indicated by step 416.

In case it is considered that the radio model of the radio node is incomplete (at least most of these coverage areas do not intersect each other), in step 417 an area indication is generated, wherein the area indication is indicative to the area associated with the data set. The area indication may for instance be indicative to a collecting process. The collecting process may for instance be used for collecting additional radio data in order to complement incomplete radio model(s) of radio node(s) associated to data set(s). For instance, the collected additional radio data may be added to the data set indicated by the area indication. At least one indoor radio map may for instance be generated based on the data collection and the data set collected by the collecting process.

In step 418, the radio model of the radio node associated with the selected data set of step 401 or 403 is discarded at least temporarily from the at least one indoor radio map in case the radio model of the radio node was determined to be incomplete in step 414. Since including the incomplete radio model of the radio node may result in bad performance of an indoor positioning system when performing and/or controlling a localization, e.g. of an electronic device, the incomplete radio model may for instance at least temporarily, e.g. until additional radio data by a collecting process has been collected and has been added to the data indicated by the area indication, be discarded.

Figure 5:
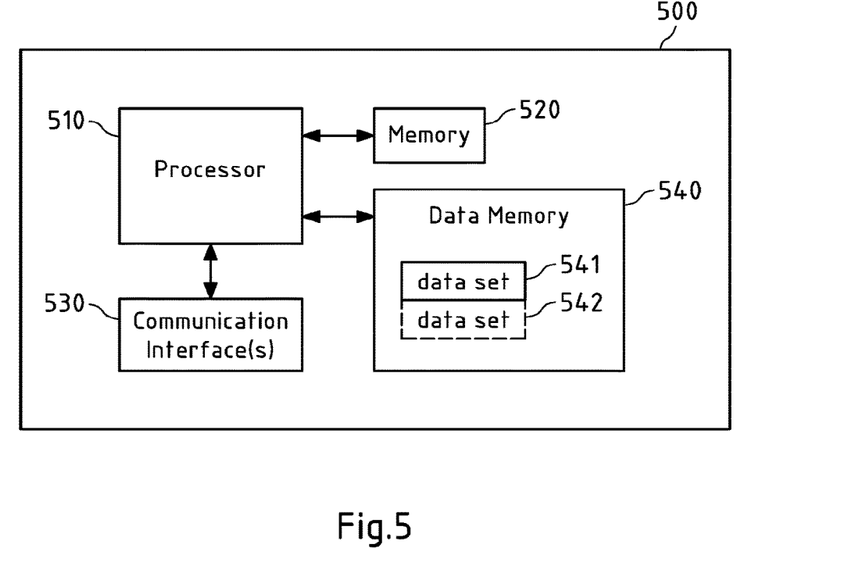
FIG. 5 a schematic block diagram of an apparatus according to an exemplary aspect of the present disclosure, e.g. terminal 120, 130, and/or server 110 of FIG. 1.

FIG. 5 is a schematic block diagram of an apparatus according to an exemplary aspect of the present disclosure, for instance performed by at least one terminal 120 and/or 130 of FIG. 1.

Apparatus 500 comprises a processor 510, memory 520, communication interface(s) 530, and data memory 540.

Apparatus 500 may for instance be configured to perform and/or control or comprise respective means (at least one of 510 to 540) for performing and/or controlling the method according to exemplary aspects of the disclosure. Apparatus 500 may as well constitute an apparatus comprising at least one processor 510 and at least one memory 520, 540 including computer program code, the at least one memory and the computer program code configured to, with the at least one processor, cause an apparatus, e.g. apparatus 500 at least to perform and/or control the method according to exemplary aspects of the disclosure.

Processor 510 may for instance execute computer program code stored in memory 520, which may for instance represent a computer readable storage medium comprising program code that, when executed by processor 510, causes the processor 510 to perform the method according to the exemplary aspects of the disclosure.

Processor 510 (and also any other processor mentioned in this specification) may be a processor of any suitable type. Processor 510 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 510 may for instance be an application processor that runs an operating system.

Memory 520 may also be included into processor 510. This memory may for instance be fixedly connected to processor 510, or be at least partially removable from processor 510, for instance in the form of a memory card or stick. Memory 520 may for instance be non-volatile memory. It may for instance be a FLASH memory (or a part thereof), any of a ROM, PROM, EPROM and EEPROM memory (or a part thereof) or a hard disc (or a part thereof), to name but a few examples. Memory 520 may also comprise an operating system for processor 510. Memory 520 may also comprise a firmware for apparatus 500.

Data memory 540 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 540 may for instance store one or more data elements and/or new data elements, as well as sharable data. Data memory 540 may for instance comprise a plurality of data elements, which represent navigation data. Each new data element stored in data memory 540 may for instance represent at least one map region. Further, each at least one map region of a new data element may border to another at least one map region of a further new data element Each data element stored at data memory 540 may comprise one or more zooming levels. There may be, for instance, at least one zoomed-in view of at least one map region of the new data element, and at least one zoomed-out view of said at least one map region of the new data element.

Communication interface(s) 530 enable apparatus 500 to communicate with other entities, e.g. with server 110 of FIG. 1. The communication interface(s) 530 may for instance comprise a wireless interface, e.g. a cellular radio communication interface and/or a WLAN interface) and/or wirebound interface, e.g. an IP-based interface, for instance to communicate with entities via the internet Communication interface(s) may enable apparatus 500 to communicate with other entities, for instance with server 110 of FIG. 1 for the transmission of at least one or more data elements to be stored locally at data memory 540.

Some or all of the components of the apparatus 500 may for instance be connected via a bus. Some or all of the components of the apparatus 500 may for instance be combined into one or more modules.

It will be understood that all presented embodiments are only exemplary, and that any feature presented for a particular example embodiment may be used with any aspect of the disclosure on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the disclosure and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The disclosure has been described above by means of example embodiments. It should be noted that there are alternative ways and variations which are obvious to a skilled person in the art and can be implemented without deviating from the scope of the appended claims.

We claim:

1. A method for localization of a mobile device, the method comprising:
   identifying, using a processor, a radio model including a representation of wireless signal propagation;
   identifying, using the processor, a cumulative coverage area;
   performing, using the processor, a comparison of a radio model coverage area of the radio model and the cumulative coverage area;
   determining, using the processor, whether the radio model is complete or incomplete based on the comparison; and
   performing localization of the mobile device, wherein the radio model is included in the localization of the mobile device when the radio model is complete and the radio model is discarded from localization of the mobile device when the radio model is incomplete.

2. The method of claim 1, wherein the comparison determines that the radio model is complete when the radio model coverage area of the radio model and the cumulative coverage area include intersecting parts.

3. The method of claim 1, wherein the comparison determines that the radio model is complete when the radio model coverage area of the radio model and the cumulative coverage area include at least a threshold intersecting percentage and that the radio model is incomplete when the radio model coverage area of the radio model and the cumulative coverage area include less than the threshold intersecting percentage.

4. The method of claim 1, wherein the radio model corresponds to a building.

5. The method of claim 4, wherein the radio model corresponds to a specific floor of the building.

6. The method of claim 1, wherein the localization comprises determination of a location of the mobile device.

7. The method of claim 1, wherein discarding the radio model from localization of the mobile device when the radio model is incomplete comprises discarding the radio model temporarily.

8. The method of claim 1, wherein the radio model corresponds to an area of at least one indoor radio map.

9. An apparatus comprising at least one processor and at least one memory including computer program code for one or more programs; the at least one memory and the computer program code configured to, with the at least one processor, cause the apparatus to at least perform:
identifying a radio model coverage area of a radio model;
identifying a cumulative coverage area;
performing a comparison of the radio model coverage area of the radio model and the cumulative coverage area; and
performing localization of a mobile device in response to the comparison.

10. The apparatus of claim 9, wherein the comparison determines that the radio model is complete when the radio model coverage area of the radio model and the cumulative coverage area include intersecting parts.

11. The apparatus of claim 9, wherein the comparison determines that the radio model is complete when the radio model coverage area of the radio model and the cumulative coverage area include at least a threshold intersecting percentage and that the radio model is incomplete when the radio model coverage area of the radio model and the cumulative coverage area include less than the threshold intersecting percentage.

12. The apparatus of claim 9, wherein the radio model corresponds to a building.

13. The apparatus of claim 12, wherein the radio model corresponds to a specific floor of the building.

14. The apparatus of claim 9, wherein the localization comprises determination of a location of the mobile device.

15. The apparatus of claim 9, the at least one memory and the computer program code configured to, with the at least one processor, cause the apparatus to at least perform:
identifying a radio node in the radio model;
identifying a maximum received signal strength measurement for the radio node; and
defining the radio model coverage area based on a predetermined range area from the maximum received signal strength measurement.

16. The apparatus of claim 9, wherein the radio model corresponds to an area of at least one indoor radio map.

17. An apparatus comprising:
a memory configured to store identifying a radio model including a representation of wireless signal propagation and a cumulative coverage area; and
a processor configured to perform a comparison of a radio model coverage area of the radio model and the cumulative coverage area, determine whether the radio model is complete or incomplete based on the comparison, and perform localization of the mobile device, wherein the radio model is included in the localization of the mobile device when the radio model is complete and discarded from localization of the mobile device when the radio model is incomplete.

18. The apparatus of claim 17, wherein the comparison determines that the radio model is complete when the radio model coverage area of the radio model and the cumulative coverage area include intersecting parts.

19. The apparatus of claim 17, wherein the comparison determines that the radio model is complete when the radio model coverage area of the radio model and the cumulative coverage area include at least a threshold intersecting percentage and that the radio model is incomplete when the radio model coverage area of the radio model and the cumulative coverage area include less than the threshold intersecting percentage.

20. The apparatus of claim 17, wherein the localization comprises determination of a location of the mobile device.

* * * * *